Oct. 20, 1936.  E. SANTONI  2,057,921
PHOTOGRAMMETRIC RESTITUTION APPARATUS
Filed Sept. 11, 1934    4 Sheets-Sheet 1

Ermenegildo Santoni
INVENTOR
By Otto Munk
his ATTY.

Oct. 20, 1936.  E. SANTONI  2,057,921
PHOTOGRAMMETRIC RESTITUTION APPARATUS
Filed Sept. 11, 1934  4 Sheets-Sheet 2

Ermenegildo Santoni
INVENTOR his ATTY.

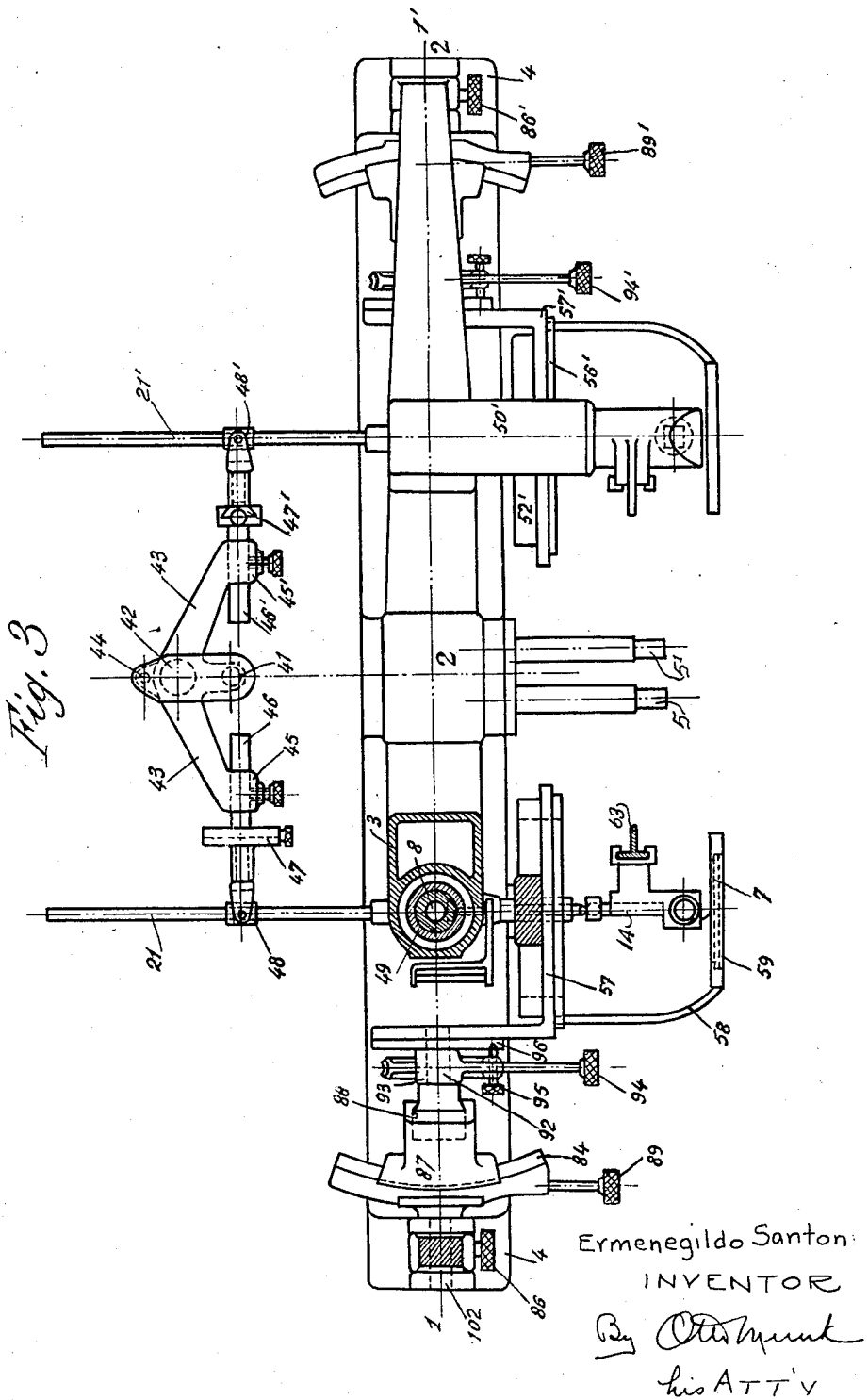

Oct. 20, 1936.  E. SANTONI  2,057,921
PHOTOGRAMMETRIC RESTITUTION APPARATUS
Filed Sept. 11, 1934   4 Sheets-Sheet 4
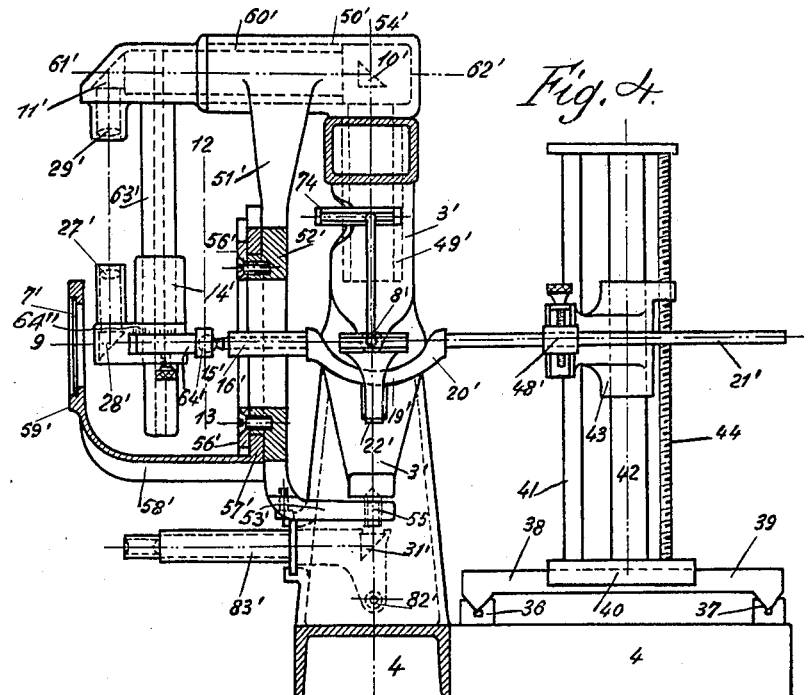
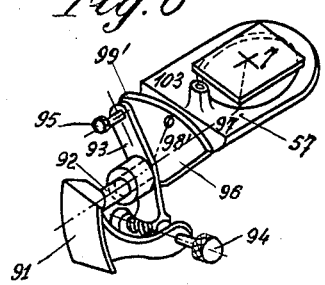
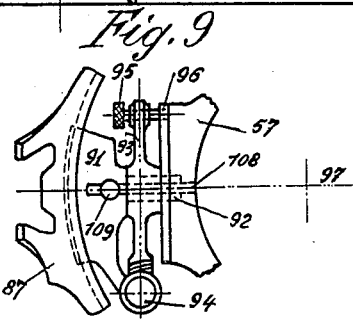
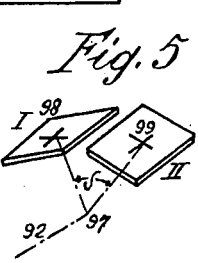
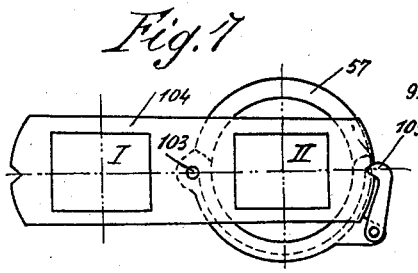
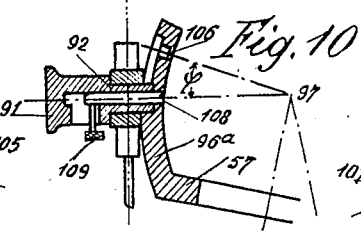
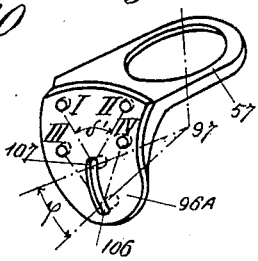
Ermenegildo Santoni
INVENTOR
his ATTY.

Patented Oct. 20, 1936

2,057,921

UNITED STATES PATENT OFFICE 2,057,921

PHOTOGRAMMETRIC RESTITUTION APPARATUS

Ermenegildo Santoni, Florence, Italy

Application September 11, 1934, Serial No. 743,506
In Italy September 28, 1933

8 Claims. (Cl. 88—29)

Photogrammetric restitution apparatus is used for two or more photograms which were simultaneously taken with a multiple camera. While the object of multiple cameras is that of photographing from one and the same point in space a wider tract of country, the object of the restitutors or rectifiers is to make possible the simultaneous placing of several photographs which were taken with the same camera from two points, so as rapidly to pass from the restitution of one pair of corresponding photographs to that of the other pairs. Once the external orientation of the photogram appertaining to one camera has been defined, the external orientations of the other pairs remain defined on the basis of the mutual angular location of the axes of the various cameras.

In the rectifiers of this class several photograms corresponding to the same viewpoint are disposed upon a single photogram-support in different planes, and relative to one another each forming angles corresponding to those formed between the focal planes of the photographic camera. Furthermore, usually a single lens similar to the photographic lenses is suitably positioned relatively to the various photograms, so that by a simple angular displacement, which may or may not be combined with mirrors, or with translatory movements, the lens may be successively moved into the exact position of the photographic lens for each photogram.

In such apparatus the optical photogram observation system traverses the above-mentioned lens. Such instruments, therefore, function on the principle of Porro's photogoniometer.

The device forming the subject of the present invention relates to rectifiers in which the photogram is directly observed without a photographic camera lens or the like. Furthermore, in my device, the various photograms which were taken with a multiple camera, instead of being in different planes, are mounted in the same plane upon a revolving photogram carrier, whereby the various plates may be successively brought into correspondence with the observation system and a mechanical device conveys the photogram-carriers and observation system from an angular position in one chamber into an angular position in another.

The observation device (binocular) while remaining fixed in its ocular portion (save for the adjustment to the various interpupilary distances) is movable in a direction parallel to the photogram in its objective portion, whereby it may be guided to explore the various points of the photogram by the polar movement of a guide-bar, which is thus progressively operated to represent the direction of the view of the point desired. Such arrangements have been used with photograms taken in or rectified into parallel planes by means of a previous photographic or a simultaneous optical rectification. In my device the photogram may take any angular position corresponding to the conditions under which the photographs are taken. The characteristic optico-mechanical device provided for this purpose permits also the automatic observation of the two photograms according to the nucleal planes.

The annexed drawings show an example of the practical carrying out of the invention as applied to a double and to a quadruple camera.

In these drawings:

Fig. 3 is a plan view of the instrument partly in section through the horizontal plane 3—3 of Fig. 2;

Fig. 4 is a side view of the instrument in section through the vertical plane 4—4 of Fig. 2;

Figs. 5, 6 and 7 show the system of substituting one photogram in another for a double-chambered camera;

Figs. 8, 9 and 10 show the supplementary motion in a quadruple camera.

According to the example shown, the instrument (see Fig. 1) is composed of two symmetrical groups, arranged along the principal axis $1-8-2-2^1-1^1$ which is parallel to the plane of representation of the survey map.

Figure 1:
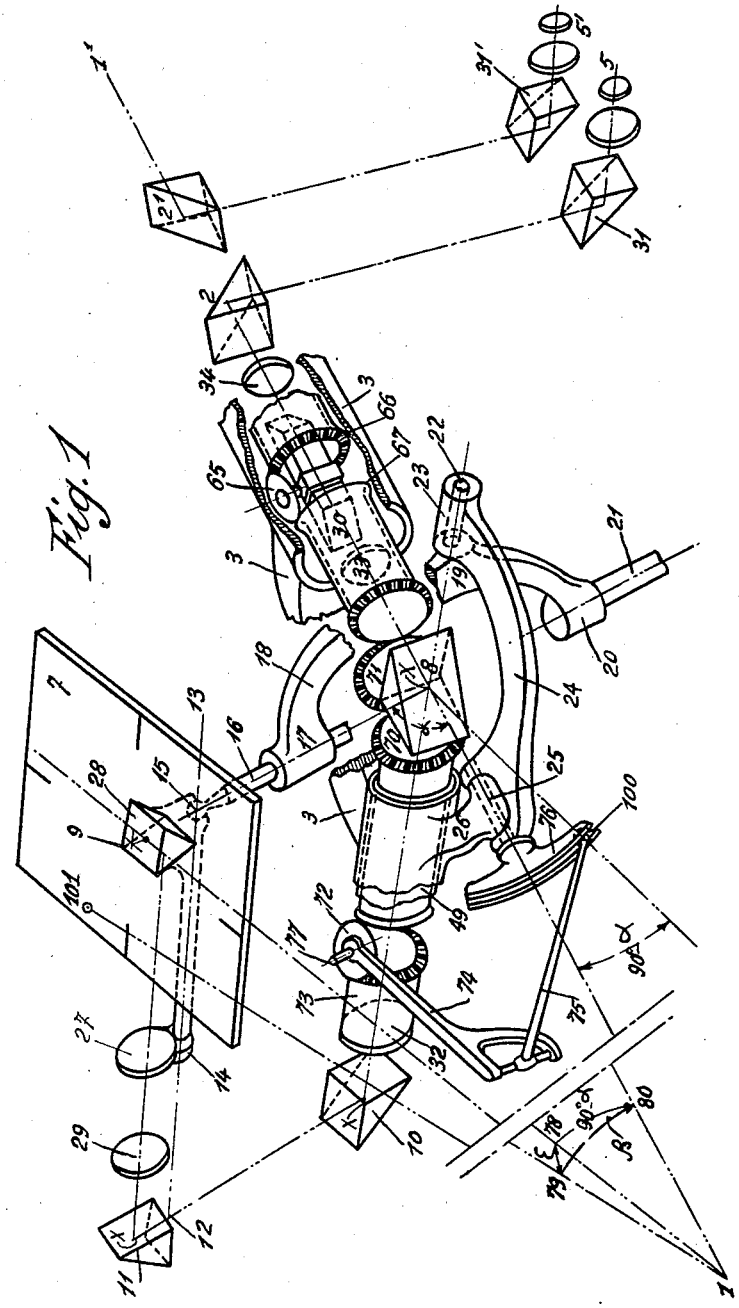
Fig. 1 is a schematic view of the photogram observation system showing the guide-bar attachment system and the nucleal observation device.

Each optical system leads the respective image towards the central part, where a binocular system $5-5^1$ permits stereoscopic observation. In Fig. 1 only the left-hand group is represented.

The photogram 7, mounted on the photogram-support (not shown in the figure) is so conveyed by means of suitable angular movements (which will be described hereinafter) as to assume, relatively to the plane of representation, the angular position corresponding to the exposure, while the point 8 represents the viewpoint. The perpendicular 8—9 let down from this point to the plane of the photogram 7 represents, therefore, the direction of the optical axis at the moment of the exposure. The photogram-carrying system carries along in its angular movements a mechanical axis 10—11, which will always be perpendicular to the plane of the photogram 7.

The axis 10—11 carries a guide-way 12—13 perpendicular thereto and which is rotatable about the said axis 10—11. In its rotation, the guide-way 12—13 defines a plane parallel to the photogram 7. The distance of this plane from the point 8 represents the focal distance of the photographic camera.

Along the guide-way 12—13 runs a carriage carrying a spherical joint 15 through which the carriage is connected to the gudgeon pin 16. The said gudgeon pin is free to slide within the sleeve 17 carried by the arm 18—19—20 (partially broken away in the drawings) which also carries the guide-bar 21.

In the construction the axis of the guide-bar 21 is on the extension of the axis of the gudgeon pin 16. The arm 17—18—19—20 is carried by a pivot pin 22 within the sleeve 23 of the arm 24. The arm 24 is, in turn, carried through a gudgeon pin 25 by the arm 26, which forms part of the element 3 that also carries the photogram-carrying system. The arm 24 is rotatable by means of the gudgeon pin 25 about the axis 1—8 and carries the guide-bar 21 and the gudgeon pin 16. The arm 17—18—19—20, is, in turn, rotatable about the axis 22 which is perpendicular to the axis 1—8. Therefore, a Cardanic joint is produced which permits a polar movement of the axis 16—21 about the viewpoint 8, and the passage through the said point 8 of the optical path of the observation system. The guide-bar 21, controlled by the rectifier carriage (of known type, not represented in this figure) will produce a polar motion followed by the gudgeon pin 16 (slidable axially) which will, through the agency of the spherical joint 15 carry along with it the carriage 14 in a sliding motion along the guide-way 12—13, and in a polar motion together with the said guide-way, about the axis 10—11. The carriage 14 carries a lens 27 and a straight prism 28 while the guide-way 12—13 carries a lens 29 and a straight prism 11. These lenses and prisms rotate about the axis 10—11 with the guide-way 12—13. The optical axis is so mounted that the optical axis 27—29 which parallels the guide-way 12—13 is deflected by the prism 28 perpendicularly to the photogram 7, being deflected by the prism 11 along the axis 10—11. The straight prism 10 which does not participate in the rotation of the guide-way 12—13 further deflects the optical axis 11—12 along the axis 10—8. The straight prism 8 deflects the axis 10—8 along 8—2 in the path of which is inserted the Amici prism 31. Finally, the prisms 2 and 31 conduct the axis to the eye-piece 5. When the axis 21—16 is in the basic position as shown in Fig. 1, i. e., perpendicular to the photogram 7, the optical axis 29—27 intercepts in the prism 28 the photogram at its main point 9. The optical path 27—9 equals the focal distance of the lens 27. 32 is a glass with parallel flat faces on which the collimation is engraved. It will be evident that, in the plane of the glass 32 an image of a portion of the photogram 7 is formed, independently of the variation of the distance between the lenses 29—27 obtained during the exploration of the various points of the photogram. In order to return the image formed at 32 in the focal plane of the eye-piece 5, the lenses 33 and 34 are inserted in the optical path. The lens 33 has a focal range corresponding to the optical path 32—8—33, while the lens 34 has a focal range corresponding to the path 34—2—31—5. The distance 33—21 may, therefore, be varied at will.

This is made use of to obtain the interpupilary variation between 5 and $5^1$. In fact, the system 34—2—31—5 is mounted upon a single support 5 which, when shifted along the axis 8—2, may be brought nearer to or moved away from the group $1^1$—$2^1$—$31^1$—$5^1$.

Figure 2:
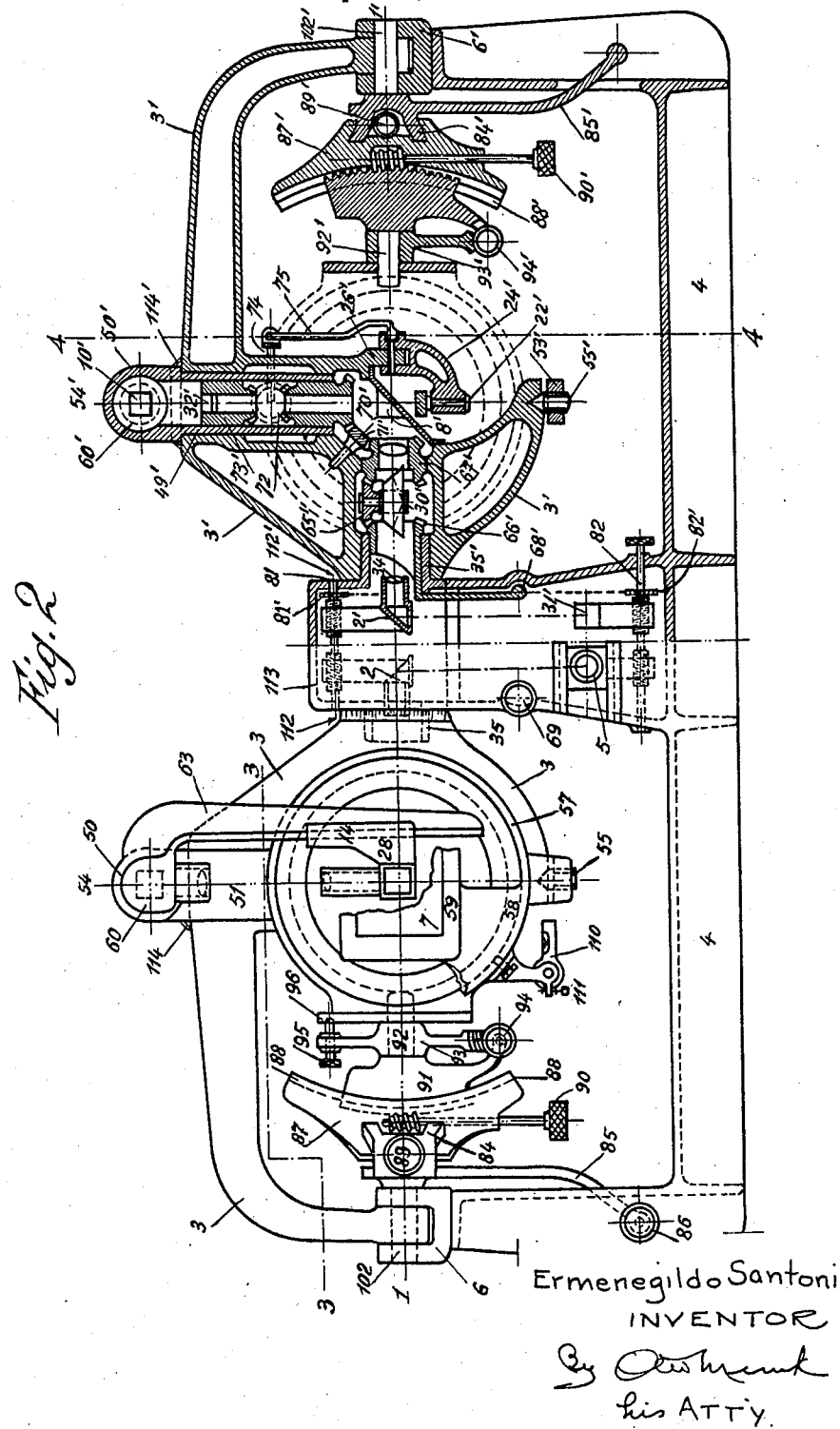
Fig. 2 is a front view of the instrument, partly in section through the plane 2—2 of Fig. 3.

In Figs. 2, 3 and 4 are represented, in one constructional form, the elements indicated schematically in Fig. 1, and the other parts of the instrument to be described hereinafter. The instrument is composed of a base 4, carrying the end supports 6—$6^1$ and the central support 35. The three supports are disposed along a single horizontal axis 1—$1^1$, which correspond to the axis 1—8—2—$2^1$—$1^1$ of Fig. 1. The base 4 (Fig. 4) carries a system of guide-ways 36—37, parallel to the fundamental axis 1—$1^1$, along which runs a carriage carrying a transverse guide-way 38—39 on which runs the carriage 40. The latter carries two vertical guide-ways 41—42 on which runs a carriage 43 driven by a screw 44. The carriage 43 (see Fig. 3 in which, for the sake of simplicity, the details 36—37—38—39—40 are omitted) carries two sleeves 45—$45^1$ within which are slidable the arms 46—$46^1$ for establishing the base component X, while the components Y and Z are established by means of the slides 47—$47^1$ carrying the Cardanic connections of the sleeves 48—$48^1$ which run along the guide-bar 21—$21^1$.

The details from 36 to $48^1$, relating to the carriages, represent an ordinary form of execution.

The central supports 35—$35^1$ (Fig. 2) are hollow cylinders, and the end pins 102—$102^1$, serve as supports for the parts 3 and $3^1$, which are rotatable about the axis 1—$1^1$, independently of one another. In the right-hand group shown in section in Fig. 2 the arm $26^1$ is seen that comprises the Cardanic system $24^1$—$22^1$—$19^1$; these latter parts correspond to the parts 26—24—19 of Fig. 1, already described.

Within the part $3^1$ (Figs. 2 and 4) is housed a hollow cylinder $49^1$. The said hollow cylinder $49^1$ is connected at right angles with the external hollow cylinder $50^1$.

The cylinder $50^1$ constitutes a system together with the arm $51^1$, the ring $52^1$, and the arm $53^1$, which latter is supported by, the conically pointed screw $55^1$, by the lower appendage of the arm $3^1$. The entire system $49^1$—$50^1$—$51^1$—$52^1$—$53^1$ is therefore rotatable about the axis $54^1$—$55^1$ (which corresponds with the axis 10—8 of Fig. 1) and it may also participate in the motion of the part 3 about the fundamental axis 1—$1^1$. A second Cardanic movement is thus produced whose centre $8^1$ coincides with the Cardanic centre of the guide-bar $21^1$.

This second Cardanic motion supports the photogram-carrying system provided with the exploration system, whereby the photogram is caused to assume the inclination corresponding to the conditions of the exposure. To this end, the ring $52^1$ supports, through the counter-ring $56^1$ the ring $57^1$ which in turn, supports through the arm $58^1$, the frame $59^1$ carrying the photogram 7. Due to the freedom of rotation of the ring $57^1$ relatively to $52^1$—$56^1$, the photogram may assume the requisite orientation. Within the cylinder $50^1$ is housed the hollow cylinder $60^1$, which may turn about the axis $61^1$—$62^1$ (corresponding to the axis 10—11 of Fig. 1).

The cylinder $60^1$ carries the prism $11^1$, the lens $29^1$ and the guide-way $63^1$, along which runs the carriage $14^1$. The said carriage $14^1$, in turn, carries the spherical joint 15¹, as well as the prism 28¹ and the lens 27¹, the whole having the functions already described in connection with Fig. 1. The focal plane, corresponding to the plane of movement of the spherical joint 15¹, may be brought nearer to or moved away from the Cardanic centre (viewpoint) in order to realize, within a certain field every possible value of the focal photographic range by moving the slide 64¹ carrying the spherical joint 15¹ relatively to the carriage 14¹. A graduated vernier scale 64¹¹¹ may be used to indicate the value corresponding to the focal range attained.

The rotation of the part 3 (see Figs. 1 and 2) about the fundamental axis 1—1¹ would cause a detrimental rotation of the image in the eye-piece. To prevent this, the Amici prism 30 is interposed in the optical path, and is mounted in the usual manner on a rotatable ring (not represented in the figure) which carries the planet-wheel 65¹—66¹—67¹ of a differential, one of whose bevel wheels 66¹ is fixed, while the other 67¹ follows the movement of the part 3¹.

In the example shown, the bevel wheel 66¹ may, in order to effect slight initial rectifications, also be caused to perform slight angular movements through the medium of the tail-piece 68¹, actuated by a screw 69. As the rotation about the axis 54¹—55¹ of the system carried by the tube 49¹ would also occasion a detrimental rotation of the image, the bevel wheel 67¹ is not actually fixed to the part 3¹, but is free to receive the angular movements performed by the tube 49¹, transmitted by the bevel wheel 70¹ connected thereto, through the intermediate wheel 71¹. The Amici prism thus simultaneously performs the function of rectifying the image, which reaches the said prism disoriented in consequence of the aforesaid rotation.

In fact, said prism, in addition to the two aforesaid functions, performs a third important function, consisting in the returning of the images observed on the two photograms to their mutual orientation, in agreement with the corresponding nucleal plane. To this end, the bevel wheel 70¹ is not fixed to the tube 49¹, but is free to rotate, controlled by the pinion 72¹, which causes also the rotation in an opposite direction, of the sleeve 73¹ upon which is mounted the glass displaying the collimation mark 32¹. The axis of the pinion 72¹ traverses the tube 49¹ and is carried by this tube. An opening in the part 3¹ opens the passage towards the outside of this axis in order to connect with it a lever 74 (see Fig. 1 likewise).

The width of the said opening permits also sufficient rotation of the tube 49¹ about the axis 54¹—55¹.

While the external lever 74 remains at a standstill, the system 70¹—72¹—73¹ rotates, together with the tube 49¹, as if it were integral therewith.

In order better to explain the function of the lever 74, I return to Fig. 1. The lever 74 carries a connecting rod 75 ending in a small ball 100 which is lodged within the groove cut in the sector 76 connected to the arm 24. The centre of the sector 76 corresponds to the point 8. The travel of the small ball 100 along the sector is brought about by the rotation of the tube 49 and, hence, of the photogram-carrying system. The axis 77 of the pinion 72 is maintained parallel to the axis 10—11 and thus, perpendicular to the photogram. In the particular case in which the optical axis 8—9 is perpendicular to the fundamental axis 1—1¹, the ball 100 will be situated on the said axis 1—1¹. In this case, the rotation of the arm 24, and hence of the sector 76, fails, due to the polar motion of the guide-bar 21, to give rise to any movement of the connecting rod 74. In such a case the nucleal planes intersect the photogram through so many parallel straight lines, whereby no correction of the orientation is called for.

In the more general case, the optical axis 8—9 will form with the fundamental axis 1—1¹ a certain angle α differing by 90°, as is indicated in Fig. 1.

Fig. 1 represents the particular case when the axis of the guide-bar 21 coincides with the optical axis. This indicates that collimation is effected at the main point 9 of the photogram. For the sake of simplicity in the drawings, the distance between the spherical joint 15 and the photogram 7 is not taken into account, at present, the photogram being assumed to be at the focal distance from 8. The nucleal plane, i. e. that passing through 1—8—9, intersects the photogram along the line 1—9 which represents the particular place for the points which are to appear in the eye-piece, following a line parallel to that connecting the pupils of the eyes of the observer, for the purpose of ensuring the best stereoscopic effect. Should this not be initially obtained, due to defective adjustment of the instrument, it might easily be brought about—as already described—through the rectification, by hand, of the screw-knob 69. In the passage from the observation of the point 9 to the observation of another generic point 101 the line extending through the nucleal plane, however, becomes 1—101, whereby rotation of the image through an angle ε becomes necessary. The value of ε is represented by the cathetus 78—79 of the triangle spherical at 78—79—80, a rectangle at 78. The other cathetus 78—80 is equal to 90°—α, α being the angle formed between the axes 1—8 and 8—9, while the angle at 80 (β) represents the dihedron through which the arm 24 will have rotated, and therefore the sector 76, in order to bring the collimation from the point 9 to the point 101. The ball 100 is initially along the sector 76 in a position corresponding to the angle 90°—α; as represented in Fig. 1. In passing from the point 9 to the point 101, the sector 76, rotating through the angle β, causes the ball 100 to move, whereby the lever 74 is rotated at an angle, ε. The length of the connecting rod 74 is equal to the radius of the sector 76. The disorientation to be corrected by the device precedes the mark 32. Therefore, the mere rotation of the image forming in correspondence with the mark, while it would improve the vision of the landscape, would disorientate the mark. In order to prevent this, the bevel wheel 72, while transmitting the requisite correction to the Amici prism, causes the mark 32 to rotate in the reverse direction by the same angle, thus definitely obtaining the permanent orientation of both mark and landscape.

For this purpose the ratio of motion between the bevel wheel 72 and the one controlled thereby should be 1 to 1.

For the interpupilary adjustment of the eye-pieces 5—5¹, the approximation and the retrocession of the prisms 2—2¹ together with the lenses 34—34¹ (Fig. 2) is effected through the rotation of the shaft 81, which carries two oppositely screw-threaded parts over which the sleeves are inserted. Each of the sleeves carries a prism 2 and 2¹ or a lens 34 or 34¹. Similarly, the rotation of the shaft 82 brings about the approximation or the retrocession of the lower prisms 31—31¹ as well as of the eye-piece-carrying tubes 83—83¹. By means of a system of gears 81¹ and 82¹ interconnected by a chain the movement of the shaft 82 is also transmitted to the shaft 81.

The elements controlling the inclination and the orientation corresponding to the exposure are constituted as follows:—(Figs. 2 and 3) A sector 84 concentric with the viewpoint 8, is integral with the pin 102 and is provided with an appendage 85 actuated by a micrometric screw 86 with an antagonistic spring (see also the details in section of the right-hand symmetrical group). Part 87 is shiftable along the sector 84, by means of the tangential screw 89. The part 87 carries a sector 88 concentric with the point 8 and located in a plane normal to that of the sector 84. Part 91 may be shifted along the sector 88 by means of the tangential screw 90. The part 91 carries the pin 92 whose axis, in the position indicated in the figure, coincides with the fundamental axis of the instrument 1—1¹. Upon manipulation of the tangential screws 89—90, the pin 92 performs translatory movements in space, but the extension thereof always traverses the viewpoint 8.

The pin 92 carries sleeve 93, carrying a toothed sector actuated by a tangential screw 94, which is carried by two appendages of the part 91. By means of the axially slidable pin 95, the part 93 may be connected to the part 96, also carried by the pin 92.

The part 96 is an appendage of the ring 57 connected to the photogram-carrier (see also Figs. 6, 8, 9 and 10). In the particular position of the various organs represented in Figs. 2, 3 and 4, the axis of the pin 92 coincides with the axis 1—1¹. Under such conditions, the turning of the tangential screw 94 causes the rotation about the axis 1—1¹ of the group of parts 93—95—96—57—51—3 and their accessories. The said parts rotate in unison to the same extent. If, owing to the shifting of the parts 87 and 91 along the respective slides 84—88, the axis 92 happens to be in some other position, by the manipulation of the said tangential screw 94 parts 93—95—57 and their accessories are rotated only about the said axis 92. The system composed of the parts 3—50—51 and of their accessories, being combined with the axes of rotation 1—1¹ and 50—55, follows the motion of the ring 57 according to the relative resultants of motion of the said axes. Always starting from the particular position represented in Figs. 2, 3 and 4, the manipulation of the tangential screw 90 would cause the rotation of the parts 91—93—96—57—58—59 about the axis 9—8 corresponding to the optical axis. That is to say, the photogram would be rotated in its own plane about the main point. The turning of the tangential screw 89 would cause the rotation of the ensemble of parts 87—91—93—96—57—50—53 and of the accessories thereof, about the axis 54—55. A movement of convergence would be obtained. When the axis 92 is no longer coincident with the axis 1—1¹, the turning of each of the tangential screws 89 produces a movement corresponding to that of the respective slide 87 as far as the ring 57, and the accessories thereof, while the groups acting in unison with the axes 1—1¹ and 50—53, perform the movements in accordance with the said axes, similarly to what occurs in connection with the screw 90. Finally, the turning of the micrometric screw 86 rotates the whole group comprising tangential screw, sectors, parts 3, etc., about the axis 1—1¹, independently of the position of the axis 92. A similar arrangement of elements for establishing the external orientation of the photogram is shown in Figs. 5, 6, 7, 8, 9, 10. Fig. 5 is a schematical representation of a double chambered photographic camera. The optical axes 98—97 and 99—97 of the two chambers form a certain angle s.

Let us assume in the chamber a material axis 97—92, normal to the planes 98—97—99. Let us also assume that the rectifier establishes the external orientation of the photographic camera by varying axis 97—92 or by the inclination and the orientation corresponding to the exposure being imparted to the said axis, relatively to the plane of representation of the instrument. All this is indicated by means of the axis 92—97 in Fig. 6.

The photogram-carrying system is constituted by a ring 57 carried by the sector 96, carried, in turn, by the axis 92. Upon the said axis 92 is mounted the part 93 provided with a sector (actuated by a tangential screw 94) and with a sliding pin 95 that may be inserted into the opening 99¹ in the sector. After the external orientation has been imparted to the axis 92—97, the tangential screw 94 may be rotated to impart to the photogram the external orientation corresponding to the chamber II. When it is desired to pass from the chamber II to the chamber I, the pin 95 is disengaged from the opening 99¹ of the sector 96, causing the photogram-carrying system to rotate about the axis 92—97 until the pin 95 enters the aperture 98¹ provided in the said sector 96. This happens when the angle formed between the lines connecting the axis 92—97 with the said openings is equal to the angle s formed between the axes of the two photographic chambers.

The parts described in Fig. 6 correspond with those indicated by like numerals in Figs. 2, 3 and 4.

Simultaneously with the changing of position of the photograms, it is necessary to effect the replacement of the photogram of chamber II by that of chamber I. This is shown in Fig. 7. The ring 57 carries a pivot or pin 103 which serves as a support for the frame 104 upon which are mounted the two photograms I and II. A stop-tooth 105 holds one of the photograms in correspondence with the axis of the ring 57. At the opportune moment, the replacement may be effected by releasing the stop 105 and turning the frame 104 about the pin 103.

More than two chambers may be provided, provided that the relative optical axes are in a single plane. In such cases, a corresponding number of apertures in the sector 96 will be required, and the frame will carry an equal number of plates with respective stop-notches for the stop-tooth 105.

A more generic application may be given to the instrument, viz. one corresponding to a multiple photographic camera with groups of chambers disposed in several planes, for instance, a quadruple camera, whose axes are disposed two by two in two planes forming an angle φ (see Figs. 8, 9 and 10). In order to effect the exchange between one couple and another it is sufficient to impart to the plate 96ᴬ an angular motion φ relatively to the axis of the pin 92. This is effected by giving to the plate 96ᴬ the shape of a spherical calotte in which is cut a groove provided at either end with two apertures 106—107 forming, with the centre 97, the angle φ. There are provided in the same plate the apertures I—II—III—IV whereof I and II form, with the aperture 107, the angle $s^1$ corresponding to that formed between a couple of chambers I—II. Similarly, the aperture III and IV form, with 106, an angle, whose value is connected with that of the other two chambers III and IV.

The extremity of the pin 92 remains fitted into the groove 106—107 while a concentric pin 108 that is shiftable by means of the external stud 109 may be brought into engagement with one or the other of the apertures 106—107.

While in Figs. 8 and 10 the line connecting the aperture 107 with the centre 97 is parallel to the plane of the ring 57, in practice it is the bisector of the angle φ that should lie parallel to the said plane. The angle $s^1$ formed on the plate 96 does not correspond to the real angle $s$ formed between the axes of the two chambers I and II, but rather to the projection thereof in a plane normal to the connecting line 107—97. This applies also to the other two chambers.

The rotatable photogram-carrier 104 (Fig. 7) is adapted to contain a number of plates corresponding to the number of apertures in the plate 96. The groove 106—107 may carry a number of apertures greater than two, and to each of these may correspond a number of apertures of the type I—II greater than two, this being for the purpose of effecting rectification in a multiple camera with a number of chambers contained in several planes.

The rectification in connection with the total number of chambers of a multiple camera by means of the manipulation of the knobs 95 and 109 applies solely to the case in which the total field of an exposure viz. that corresponding to the sum of the fields of each chamber, totally overlaps that of the successive exposure. Let us now assume a quadruple camera in which only the overlapping of the field of the chamber III and IV of an exposure and of the chambers I and II of the successive exposure occurs. Let it be assumed, for instance, that the photograms III and IV have been mounted in the left-hand group of the rectifier, which photograms have a field in common with the photograms I and II of the successive exposure, mounted in the right-hand group. In such case, the passage in the left-hand group, through the shifting of the pin 108 from the position of the chambers III and IV to the position corresponding to the cameras I and II, cannot give rise to rectification as regards the said chambers, unless recourse be had to a reversal of the images between the eye-pieces 5—$5^1$ by means of well-known arrangements. It is, however, possible in the rectifier forming the object of the present invention, to utilize the positions assumed by the left-hand photogram-carrier for the chambers I and II by transferring the angular values relative to such positions to the right-hand group, together with the photogram-carrier 104 containing the plates I and II.

This is effected as follows:—After having, through a manipulation of the pins 108 and 95, conveyed the left-hand photogram-carrier to the position of chamber I, the spirit level 110 is mounted upon the ring 57, which level may be rotated by means of the knob 111 until the air bubble is brought to the centre. Furthermore, the part 3 (Fig. 2) carries, in the direction of the central support 35, a graduated arc 112, upon which a vernier, fixed to the central box 113, permits the reading of an angle corresponding to the position assumed by the part 3. Similarly, the part 49 carries a graduated arc 114, upon which a vernier fixed to the part 3 permits the reading of an angle corresponding to the position assumed by the part 49 (and consequently by the entire system rotatable therewith) relatively to the part 3 (see the corresponding details in the right-hand group, Fig. 2).

The level 110 may be removed from the left-hand group and mounted in the right-hand group together with the photogram-carrier.

By actuating the knobs $89^1$—$90^1$—$94^1$, it will be possible to impose upon the two right-hand scales $112^1$ and $114^1$ the values read off on the left, and to impart to the ring $57^1$ such a position that the bubble 110, having been shifted thereto, may again become centered. Thus, the right-hand photogram-carrying group assumes a position corresponding to that of the left-hand group for the plates I.

The group pertaining to the spirit level 110 may be simply fixed to the plate-carrier plates 104. In case it should be desired to shift the position of several chambers, said plate will carry a corresponding number of levels.

In order to impart to the photogram-carrier group the angular rotation corresponding to the exposure, the slides are moved by the knobs 89—90—94. The sector 84 may therefore lie in a plane common to the sector $84^1$ and such plane may be normal to the axis of the guideway 42 (Figs. 3 and 4). After the reciprocal optical orientation of the two photograms has been effected through turning (in opposite directions) the knobs 89—$89^1$, it is possible to rotate the optical model in the plane normal to the guideway 42. By turning the knobs 86—$86^1$ in the same direction, the optical model will be rotated relatively to the axis 1—$1^1$.

The knobs 86—$86^1$—89—$89^1$ may be provided with a graduation permitting the measurement of the angular displacements. In connection with these rotations suitable variations are required to be made in the base components x—y—z.

It is to be understood that the drawings constitute exemplifications which may be varied without departing from the scope of the invention defined in the claims.

Having now particularly described and ascertained the nature of my said invention and in what manner the same is to be performed, I declare that what I claim is:

1. In an apparatus of the class described composed of two symmetrical optical parts each of which has a common main axis and a secondary axis normal thereto, a photogram-carrying system, means for rotating it about a point representing the prospective viewpoint into the angular position corresponding to the exposure, an optical observation system comprising optical means having an object lens and prism mounted upon a carriage, means for displacing the carriage in a plane parallel to the photogram, said last-mentioned means including a guide bar pivoted at the viewpoint.

2. An apparatus according to claim 1, and in which means are provided for rotating the photogram-carrying and the optical exploration system about the main and the secondary axes, said axes intersecting at the viewpoint, observation eyepieces located near the center of the instrument between the two symmetrical halves of same, and means for conducting the optical path along the aforesaid main and secondary axes towards the said eyepieces with a view to permitting binocular vision.

3. In an apparatus according to claim 1, an Amici prism in the optical path, means including two bevel gears between the main and the secondary axes and a differential gearing for rotating the said prism at one-half of the angular movements of the photogram-carrying system about the main and the secondary axes, whereby the image is maintained oriented.

4. In an apparatus according to claim 1, an Amici prism in the optical path, means for rotating the said prism about the main axis at one-half of the angular movement of the photogram-carrying system, an arm carrying the guide bar, means for rotating the said arm about the main and the secondary axes, a grooved sector connected to the means for rotating the said arm about the main axis, a ball within the grooved portion of said sector, a connecting rod, and a lever connected to the said ball for the purpose of causing a supplementary rotation of the Amici prism, for maintaining the images oriented in the eyepiece system in accordance with the nucleal planes.

5. In an apparatus of the class described, having a main optical axis and a secondary optical axis normal thereto, a photogram-carrying system, means for turning it about a point representing the prospective viewpoint to give it the angular position corresponding to the exposure of the photogram, an optical photogram exploration system comprising a carriage, means for displacing the carriage in a plane parallel to the photogram and including a guide bar, means to mount said bar to pivot at the viewpoint, means for imposing the movements of inclination and orientation of the photogram upon the photogram-carrying system, the last-mentioned means including a system of slides and of sectors concentric with the prospective viewpoint for shifting said slides, a pin actuated by the said sectors whose (extended) geometrical axis passes through the viewpoint, and gearing carried by the said pin for rotating the photogram-carrying system by an angle corresponding to that formed between the optical axes of a multiple camera, having the said axes lying in one and the same plane, which is normal to the axis of the said pin.

6. An apparatus according to claim 5, characterized by an axially slidable gudgeon pin to shift the turning point of the photogram-carrying system relatively to said pin.

7. An apparatus according to claim 5, in which a plurality of photograms are carried in the same plane by the photogram-carrying system through a revolving means, and stops for holding said carrying system.

8. An apparatus according to claim 5, characterized by levers for rotating the optical systems about the main axis, and graduated knobs for effecting and measuring the said rotation, all the other angular movements of the photogram carriers being effected independently of the said levers.

ERMENEGILDO SANTONI.